(12) United States Patent
Gendler et al.

(10) Patent No.: US 12,326,772 B1
(45) Date of Patent: Jun. 10, 2025

(54) TOGGLE-BASED POWER MANAGEMENT

(71) Applicant: Apple Inc., Cupertino, CA (US)

(72) Inventors: Alexander Gendler, Kiryat Ata (IL); Ilya Granovsky, Kiryat Tivon (IL)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 18/300,220

(22) Filed: Apr. 13, 2023

(51) Int. Cl.
*G06F 1/32* (2019.01)
*G06F 1/3215* (2019.01)
*G06F 1/324* (2019.01)

(52) U.S. Cl.
CPC ............ *G06F 1/324* (2013.01); *G06F 1/3215* (2013.01)

(58) Field of Classification Search
CPC .............................. G06F 1/324; G06F 1/3215
See application file for complete search history.

(56) References Cited

U.S. PATENT DOCUMENTS

| 7,474,247 | B1* | 1/2009 | Heinks | H03M 3/366 |
| | | | | 341/143 |
| 2011/0219208 | A1 | 9/2011 | Asaad et al. | |
| 2012/0062300 | A1 | 3/2012 | Ouellette et al. | |
| 2016/0268005 | A1 | 9/2016 | How | |
| 2016/0375851 | A1* | 12/2016 | Futai | B60R 21/207 |
| | | | | 280/728.2 |
| 2020/0310998 | A1* | 10/2020 | Laursen | G11C 7/1006 |
| 2023/0401164 | A1* | 12/2023 | Kruse | G06F 13/1668 |

* cited by examiner

*Primary Examiner* — Nitin C Patel

(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to data rate limiting based on toggle rate. In some embodiments, toggle detector circuitry determines a toggle rate between consecutive clock cycles for node circuitry that communicates via a data bus and provides toggle information to data rate limiter circuitry based on the determined toggle rate. The data rate limiter circuitry may limit data rate based on toggle information and the one or more limit inputs. Toggle detector circuitry may be configured to aggregate the toggle rate over multiple cycles using a rolling multi-cycle window, generate toggle information for windows of different lengths, generate toggle information for different data, or some combination thereof.

20 Claims, 8 Drawing Sheets

TOGGLE-BASED POWER MANAGEMENT

BACKGROUND

Technical Field

This disclosure relates generally to power management for an integrated circuit and more particularly to controlling the data rate of the integrated circuit based on toggle rate.

Description of Related Art

Modern computing devices often include a variety of components that may or may not be active for given tasks. Further, a given processor may operate under substantially different workloads at different times. A computing device may also operate in different conditions (e.g., temperatures) and use different power sources (e.g., battery power or a wired power supply).

Power management circuitry may limit operations by certain circuits based on inputs such as current draw, supply voltage level, temperature measurements, etc. Efficient power management may retain satisfactory performance and also avoid overheating, poor battery life, etc.

DETAILED DESCRIPTION

As mentioned above, power management is important for various reasons such as performance, heat management, battery health, etc. U.S. patent application Ser. No. 17/676,665, filed Feb. 21, 2022 and titled "Power Delivery Reduction Scheme for SoC," is incorporated by reference herein in its entirety. The '665 patent discusses techniques for data rate limiting based on various trigger signals. A data rate limiter may limit the rate of operations by a given circuit based on various operating conditions such as temperature, current draw, supply voltage, etc. As one example, a data rate limiter may insert delay cycles into a memory controller pipeline to reduce its power consumption over a time interval.

Note that traditional rate limiting may assume a worst-case scenario in terms of one or more types of activity. For example, a data rate limiter may trigger based on an assumption that all bits of a given data bus could toggle each cycle. Therefore, the rate limit activity may provide a sufficient margin for this worst-case scenario. This conservative approach may overly reduce performance, however, particularly in scenarios with low data toggle activity.

Therefore, in detailed embodiments discussed below, toggle detector circuitry measures toggle activity and control circuitry utilizes the toggle activity as an input to rate limiting decisions. Relative to traditional techniques, disclosed circuitry may advantageously be less conservative in its rate limiting. In particular, rate limiting may be reduced or avoided when the toggle rate of relevant data is low (e.g., because a low toggle rate implies non-worst-case power consumption). For example, if a circuit exhibits high power usage and a low toggle rate, it may require less data rate limiting than if it were exhibiting high power usage and a high toggle rate.

In some embodiments, toggle detector circuitry is configured to aggregate the toggle rate over multiple clock cycles using a rolling multi-cycle window. Further, multiple toggle detectors may be included to determine toggle rates for different window lengths, different data, or different data portions (e.g., portions of a data bus) in a given clock cycle. Accordingly, multi-detector trigger logic may be configured to receive toggle information from multiple toggle detectors and determine whether to trigger rate-limiting based on that toggle information.

Control circuitry may also generate power consumption estimates that are based on toggle rate.

Overview of Limit Control Based on Toggle Rate

Figure 1:
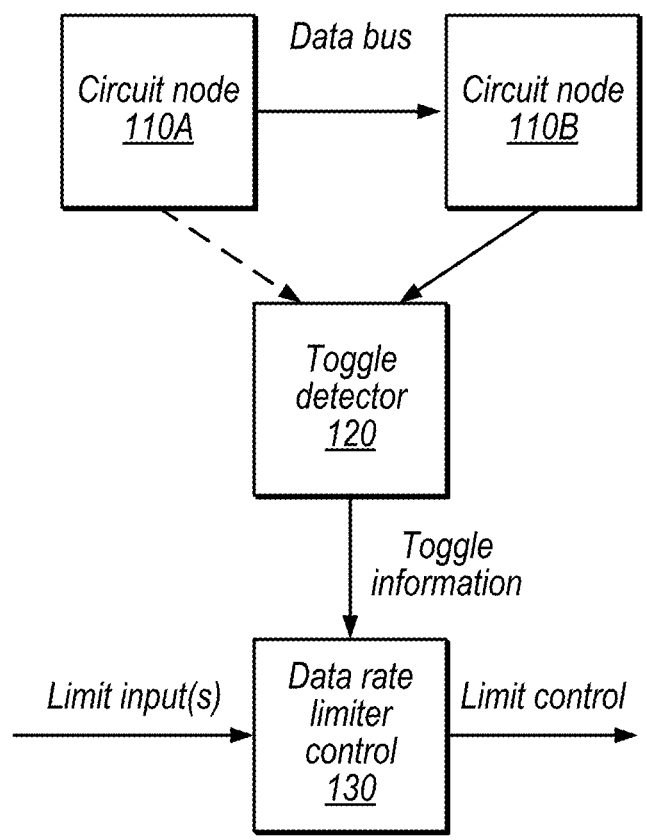
FIG. 1 is a block diagram illustrating an example circuit with data rate control, according to some embodiments.

FIG. 1 is a block diagram illustrating an example circuit with data rate control, according to some embodiments. In the illustrated example, a processor includes nodes 110A-110B, toggle detector 120, and data rate limiter control 130.

Node circuitry 110, in the illustrated embodiment, communicates via a data bus, which may communicate multiple bits in parallel in a given cycle. Nodes 110 may be consecutive pipeline stages of a memory controller, for example. In the memory controller context, substantial toggling activity may translate to substantial dynamic power consumption in memory circuitry. Nodes 110 may include sequential circuitry (e.g., flops) configured to transmit or receive data via the data bus in a given cycle.

Toggle detector circuitry 120, in some embodiments, is configured to measure the toggle rate of data on the data bus. The toggle rate corresponds to the number of data bits that are different between cycles (e.g., switched from 0 to 1 or 1 to 0). For example, toggle detector circuitry 120 may determine the difference between data in consecutive nodes (such as nodes 110) in a given cycle. As another example, toggle detector circuitry 120 may store previous data value(s) from one circuit node (e.g., node 110B) and use the stored data to compare data from different cycles. In this case, the connection indicated by the dashed line in FIG. 1 may not be used.

Toggle detector 120 may be configured to aggregate or average toggle rate over a time window (e.g., a certain number of processor cycles), as discussed in detail below with reference to FIGS. 2-3. In some embodiments, the window is programmable, toggle detector(s) may measure toggle rate over multiple different windows, or both. In other embodiments, toggle detector 120 may report per-cycle toggle information.

As shown, toggle detector 120 is configured to output toggle information to data rate limiter control 130. This toggle information may have various different encodings in different embodiments. As one example, the toggle information may be a trigger signal (e.g., a Boolean value that indicates whether a threshold trigger rate is detected). As another example, the trigger information may indicate an amount of toggling (e.g., it may encode an indication of N bits flips over M cycles).

Data rate limiter control circuitry 130, in some embodiments, is configured to receive toggle information from toggle detector 120 and other limit inputs (e.g., supply-voltage information, electrical current draw information, temperature information, or component activity information etc.). Generally, the toggle rate is related to dynamic power consumption: a relatively greater toggle rate indicates a greater power consumption. Accordingly, measuring the toggle rate may assist in processor power management.

As shown, data rate limiter control 130 generates, based on toggle information and limit inputs, a limit control signal in some embodiments. Data rate limiter control 130 may generate the limit control signal based on various algorithms or on logic that operates on one or more combinations of inputs. For a given scenario in which the other limit input(s) remain constant, data rate limiter control may assert or de-assert limit control signaling based on the toggle rate information. Note that data rate limiter control 130 may also make a subset of limit control decisions without considering toggle information and another subset based on considering toggle information as an input.

The limit control signal may cause one or more data rate limiter circuits (not shown) to perform one or more data rate limiting techniques that limit data rates (e.g., of the data bus, of circuitry that operates on data from the data bus, etc.). A data rate limiter may, for example, limit instruction issue rates by inserting delay cycles (which may also be referred to as stall cycles or idle bubbles). The delay cycles may reduce dynamic power consumption by that circuitry. As another example, a data rate limiter may be configured to reduce the frequency of an input clock to sequential circuitry as an alternative or additional technique to reduce power consumption.

Generally, disclosed techniques may advantageously improve the resolution of input data to data limit techniques, which may enable power management to avoid undesirable scenarios while improving performance relative to traditional power management techniques.

In some embodiments, control circuitry is configured to disable the toggle detector 120 in certain scenarios, e.g., to reduce power consumption when it is not needed. For example, the toggle detector 120 may be most useful in peak power scenarios and control circuitry may clock gate, power gate, or otherwise disable toggle detector 120 in other scenarios. The control circuitry may wake the toggle detector 120 in response to detecting a threshold power or performance scenario.

Example Toggle Detector Circuitry

Figure 2:
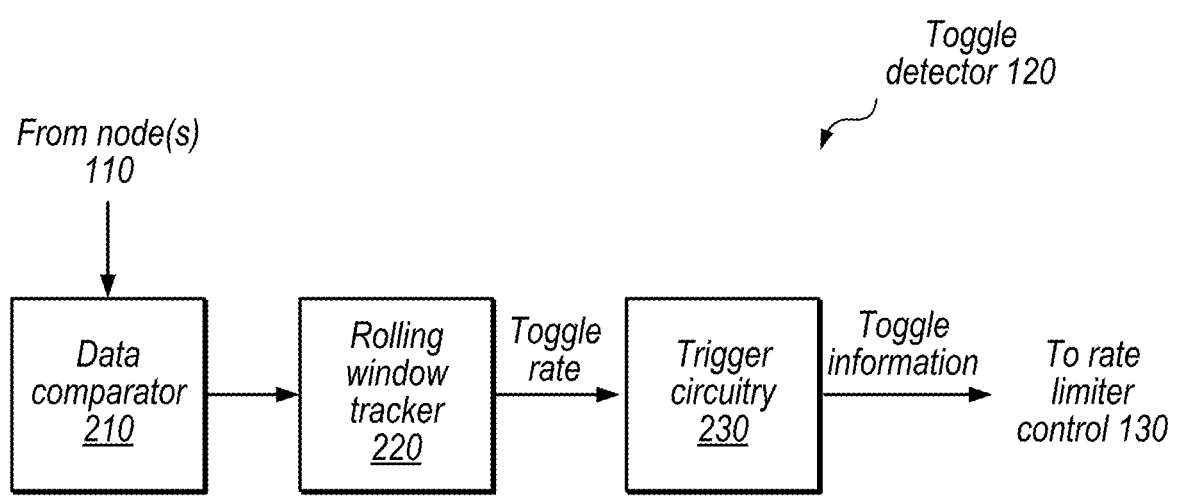
FIG. 2 is a block diagram illustrating an example toggle detector, according to some embodiments.

FIG. 2 is a block diagram illustrating an example toggle detector, according to some embodiments. In the illustrated embodiment, toggle detector 120 includes a data comparator 210, a rolling window tracker 220, and trigger circuitry 230. Toggle detector 120 receives input from node(s) 110 and outputs toggle information to data rate limiter control 130.

Data comparator circuitry 210, in some embodiments, is configured to compare data from nodes 110 (or compare data from a given node from different clock cycles). Data comparator 210 is configured to output information indicating a per-cycle number of toggles, in some embodiments. A more detailed example implementation of circuitry 210 is discussed below with reference to FIG. 3.

Rolling window tracker circuitry 220, in some embodiments, is configured to receive the output of data comparator 210 and generate toggle rate information for trigger circuitry 230. For example, rolling window tracker 220 may aggregate the toggle rate over multiple cycles.

In some embodiments, toggle detector 120 includes multiple rolling window trackers that operate on the output of the same data comparator 210. The toggle rate may thus be measured over multiple rolling windows of different lengths. Multiple rolling window trackers 220 of different lengths may provide a more detailed profile of toggling activity which may advantageously enable more precise rate limiting, according to some embodiments.

Figure 4:
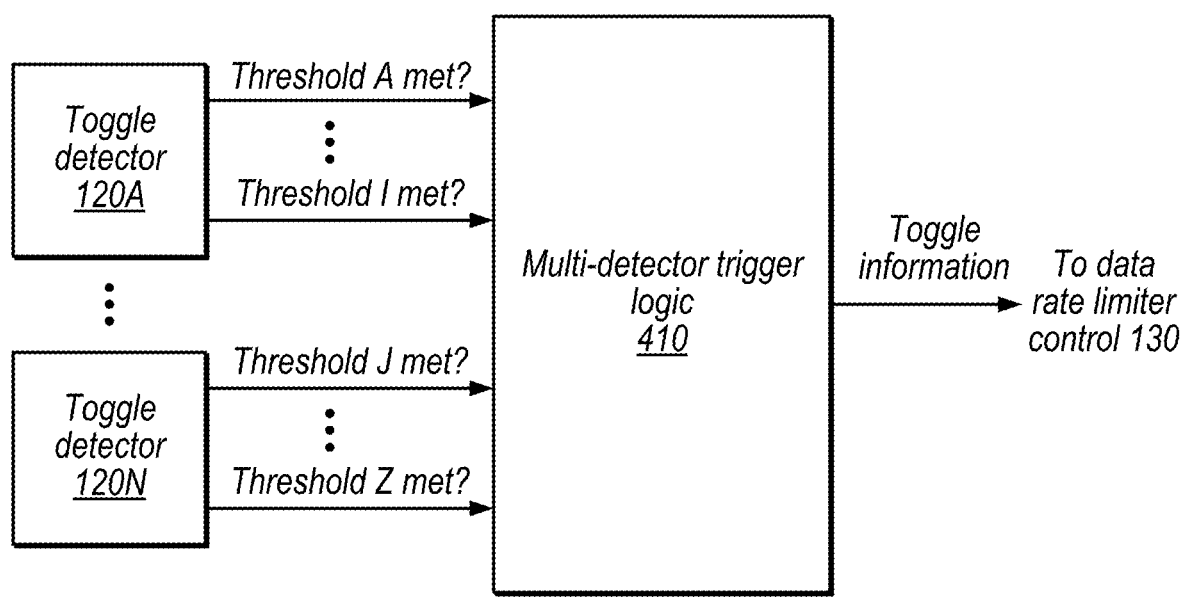
FIG. 4 is a block diagram illustrating example multi-detector trigger logic, according to some embodiments.

Trigger circuitry 230, in some embodiments, is configured to receive toggle rate information and outputs toggle information (e.g., a toggle-based trigger) for rate limiter control circuitry 130. Trigger circuitry 230 may assert a trigger based on detection of various threshold scenarios. As one example, the toggle rate meeting a threshold over the rolling window may be a first threshold scenario and may cause trigger circuitry 230 to assert a trigger. As other examples, trigger circuitry 230 may assert triggers based on logical combinations of multiple different thresholds being met, based on arithmetic operations performed on toggle rate values from different rolling window trackers and comparison of an output to one or more thresholds, etc. FIG. 4, discussed in detail below, provides an example of trigger circuitry that operates based on outputs from multiple rolling window trackers. Note that thresholds are configurable (via e.g., control registers) in some embodiments, which may allow customization for different workloads, different versions of a processor architecture, updates based on performance information, etc.

Note that trigger circuitry 230 is omitted in some embodiments. In these embodiments, rolling window tracker 220 may directly output the toggle rate to data rate limiter control 130. Generally, control circuitry that generates or processes toggle information may be included in toggle detector 120, limiter control circuitry 130, other circuitry, or some combination thereof. In embodiments with such control circuitry in multiple different blocks, the amounts of computation and decision circuitry in different blocks may vary.

In some embodiments, control circuitry is configured to save toggle information (e.g., in a register, in a pre-determined memory space, etc.) such that the toggle information is available for debug or available to software (e.g., an operating system, a kernel, etc.). This may allow use of the toggle information for telemetry, for example.

Figure 3:
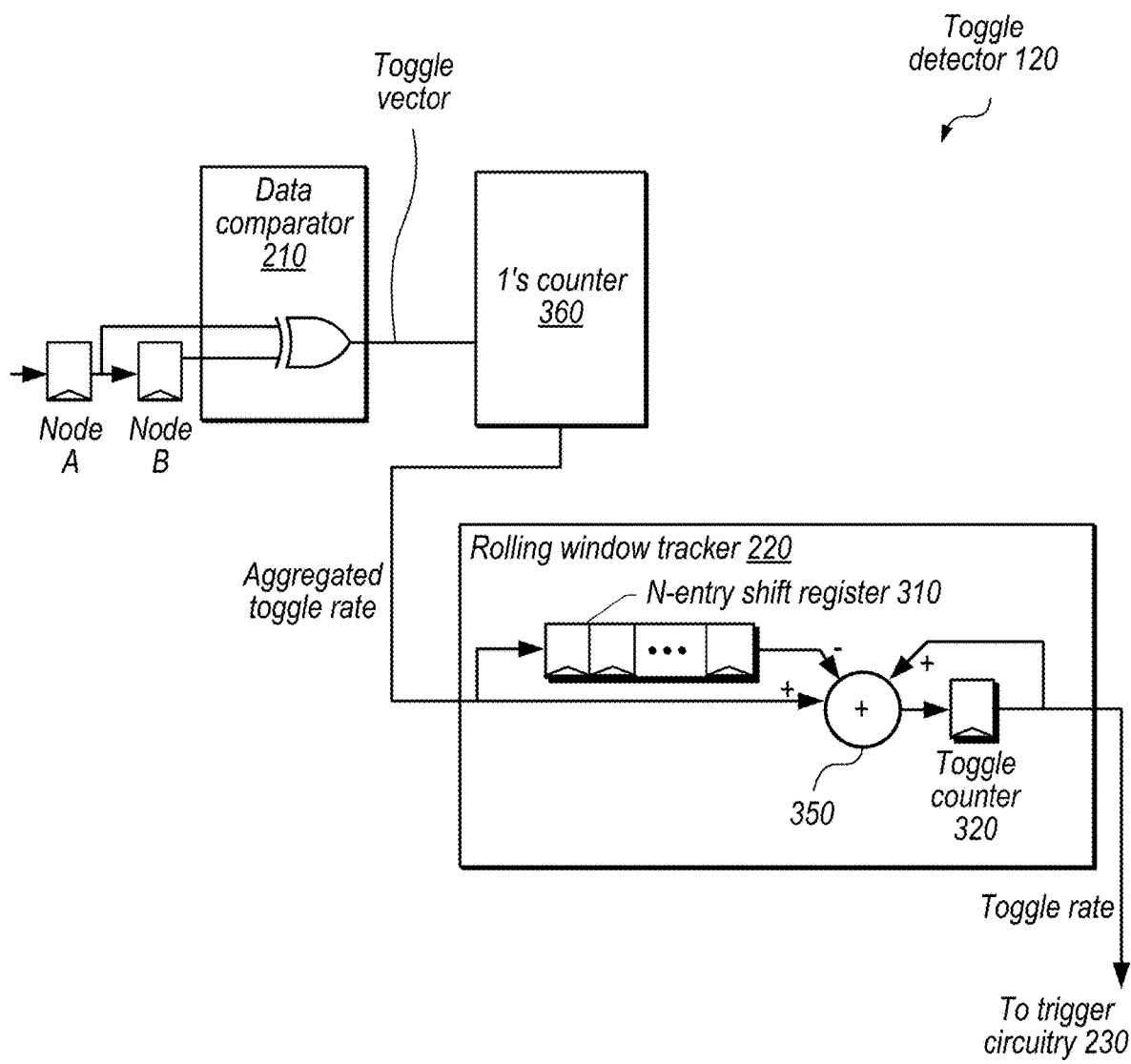
FIG. 3 is a block diagram illustrating a more detailed example toggle detector, according to some embodiments.

FIG. 3 is a block diagram illustrating a more detailed example toggle detector, according to some embodiments. In particular, FIG. 3 shows example implementations of data comparator 210 and rolling window tracker 220. These implementations are not intended to limit the scope of the present disclosure, however, and other circuit implementations of these elements are contemplated.

Data comparator 210, in the illustrated embodiment, includes exclusive-or (XOR) circuitry configured to compare data values at different circuit nodes A and B in a given cycle. In some embodiments, data comparator 210 is configured to XOR all or a portion of the bits at node A with corresponding bits at node B and output the results of XOR operations as a toggle vector that indicates the number of toggles that occurred in a given cycle. In these embodiments, each bit in the toggle vector indicates whether a bit toggle occurred, and the sum of the set bits in the toggle vector corresponds to the overall number of toggles for the compared bits of the data bus, in a given cycle.

1's counter circuitry 360, in some embodiments, is configured to count the number of set bits in the toggle vector and provide the toggle count to rolling window tracker 220.

1's counter circuitry 360 may be implemented using a compression tree, for example. In some embodiments, 1's counter circuitry 360 is configured to quantize the toggle count. For example, a 2-bit signal may indicate the toggle rate at the granularity of $\frac{1}{4}^{th}$ of the data bus, a 3-bit signal at $\frac{1}{8}^{th}$ of the data bus, and so on. This quantization may allow for a sufficient characterization of the toggle rate in certain architectures or scenarios with a reduced number of toggle count bits. In other embodiments, various toggle control circuitry operates on precise toggle rate information that exactly identifies the number of bits toggled in a given cycle, without quantization.

1's counter 360, in some embodiments, may be configured to aggregate the toggle count over a certain number of cycles (which may be smaller than the window tracked by circuitry 220) before reporting the toggle rate to circuitry 220.

Rolling window tracker 220, in the illustrated embodiment, is configured to receive the aggregated toggle rate from 1's counter 360 and output a toggle rate for the current window. In the illustrated example, rolling window tracker 220 includes an N-entry shift register 310, summation circuitry 350, and a toggle counter 320.

N-entry shift register 310, in the illustrated embodiment, is configured to store toggle count information received from data comparator 210 for different times intervals. As one example, each entry may store toggle rate for a given clock cycle. As shown, register 310 is updated with every clock cycle: its leftmost entry receives the number of toggles for the latest measured clock cycle, while its rightmost entry is the oldest entry and is shifted out each cycle.

In some embodiments, the length N of register 310 is programmable. For example, the register may physically implement a certain number of entries but a configuration register may control the number of entries being used by routing the output of the oldest entry (at the programmed size) to summation circuitry 350.

Summation circuitry 350, in the illustrated embodiment, outputs the latest sum of toggle counts over the past N cycles. As shown, at every clock cycle, 1's counter 360 outputs a cycle toggle count that becomes the first/leftmost N-entry shift register 310 and is also input into summation circuitry 350. Toggle counter 320 feeds back the previous toggle sum over N cycles to maintain the toggle sum value. The Nth/rightmost entry of register 310 is removed from register 310 and subtracted from the sum at toggle counter 320.

Numerically, the output of summation circuitry 350 equals the previous toggle count over N cycles (from toggle counter 320) plus the latest toggle count (from 1's counter 360) minus the oldest toggle rate (from the oldest entry in N-entry shift register 310). The output of toggle counter 320, in the illustrated embodiment, thus corresponds to the sum of all entries of shift register 310.

Toggle counter 320, in the illustrated embodiment, is configured to feed back the toggle sum at previous clock cycle into summation circuitry 350 and store the updated/current toggle sum received from summation circuitry 350.

Rolling window tracker 220, in the illustrated embodiment, is configured to output the toggle rate to trigger circuitry 230 (in other embodiments, tracker 220 may provide this information directly to data rate limiter control 130). In some embodiments, rolling window tracker 220 may determine an average toggle rate (e.g., per cycle or over multiple cycles). For example, rolling window tracker 220 may divide or right-shift the output of toggle counter 320.

Example Trigger Logic for Multi-Toggle-Detector Embodiments

FIG. 4 is a block diagram illustrating example multi-detector trigger logic, according to some embodiments. In various embodiments, multi-detector trigger logic may generate trigger signals or toggle rate information based on outputs of multiple toggle detectors. This may advantageously provide more granular information regarding toggle activity in different parts of a system or different portions of a given signal.

Multiple toggle detectors 120, in the illustrated embodiment, are configured to measure toggle rates of different buses or different portions of a given bus and output indications of one or more thresholds being met. For example, one toggle detector may be configured to detect the toggle rate for the upper part of a bus, while another toggle detector may be configured to detect the toggle rate for the lower part of the same bus.

In the illustrated example, toggle detector 120A outputs indications of whether thresholds A-I are met, while toggle detector 120N outputs indications of whether different thresholds J-Z are met. Alternatively, in some embodiments, toggle detectors 120 output indicators corresponding to the same thresholds (e.g., each toggle detector 120 outputs an indication of the same minimum and/or maximum thresholds being met). Toggle detectors 120 may, in some embodiments, additionally or alternatively output their respective toggle rates to multi-detector trigger logic circuitry 410.

Multi-detector trigger logic circuitry 410, in some embodiments, is configured to receive toggle information (e.g., threshold indications) from toggle detectors 120 and output toggle information to data rater limiter 130. The toggle information may include an indication (e.g., a binary signal) of whether a threshold toggle scenario has occurred. Different combinations of threshold information from toggle detectors 120 may, in some embodiments, correspond to different threshold toggle scenarios. For example, a first threshold scenario may indicate that threshold A is met while threshold J is not met, while a second threshold scenario may indicate that both thresholds A and J are met.

In other embodiments, the toggle information is a value indicating a toggle rate based on combination or weighting of various toggle rate information from the toggle detectors. The toggle information may also be a multi-bit signal that indicates whether or not multiple different toggle scenarios have occurred. Toggle information may thus include a toggle rate for a single detector, an aggregated (e.g., average) toggle rate from multiple detectors, separately encoded toggle rates from multiple detectors, trigger information for one or more toggle scenarios, or some combination thereof.

Multi-detector trigger logic 410 may use various logic gates to determine whether a given toggle scenario has occurred, such as AND, OR, majority, etc. As one example, multi-detector trigger logic may assert a trigger in response to either all toggle detectors indicating a lower threshold toggle rate or at least one toggle detector indicating a higher threshold toggle rate.

Data rate limiter control 130 may, in some embodiments, limit the data rate in a given scenario based on toggle information from multi-detector trigger logic 410. Data rate limiter control 130 may in some embodiments be further configured to decide whether to start rate limiting based on toggle information in combination with other inputs (e.g., limit inputs). As previously discussed, data rate limiting techniques may include inserting delay cycles and reducing a frequency of an input clock to the node circuitry.

Furthermore, data rate limiter control 130 may, in some embodiments, be configured to implement gradual rate limiting based on one or more limit inputs and toggle information. For example, as previously discussed, high power usage but a low threshold toggle scenario may require less limiting than high power usage and a high threshold toggle scenario. Accordingly, data rate limiter control 130 may send a signal causing only the insertion of a relatively small number of delay cycles in a low toggle rate/high current scenario, but resort to additional limiting measures such as reducing frequency or adding more delay cycles in a high toggle rate/high current scenario.

Power Estimation Based on Toggle Rate

Power estimation circuitry, in some embodiments, is configured to use various toggle information discussed herein to estimate power consumption. Power estimation circuitry may for example use a toggle rate as an input to evaluate the dynamic power consumption of circuitry that operates on the data from the data bus. In some embodiments, control circuitry is configured to write various toggle information disclosed herein as telemetry information or write telemetry information that is calculated based on the disclosed toggle information. Control circuitry may store this telemetry information in software-accessible storage elements (e.g., registers, memory, etc.). This may facilitate software-based power management in addition to or in place of hardware-based power management techniques.

Example Method

Figure 5:
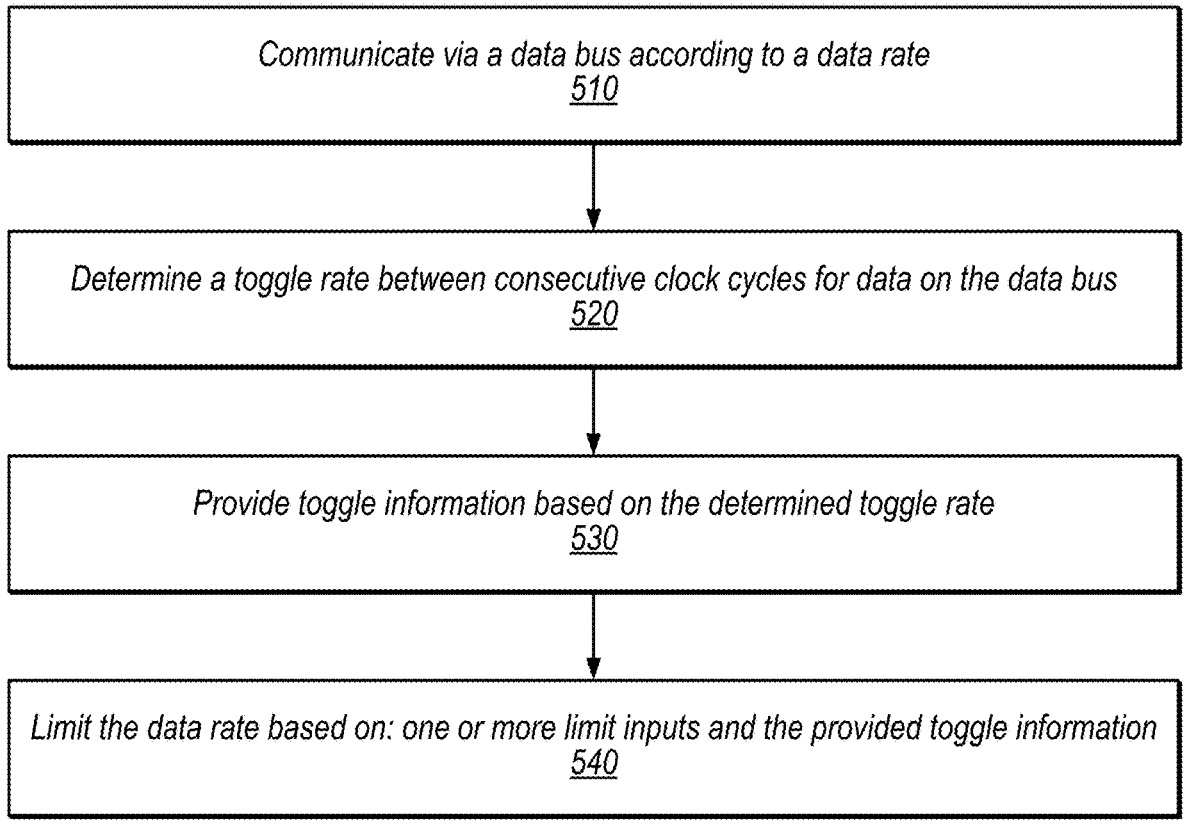
FIG. 5 is a flow diagram illustrating an example method, according to some embodiments.

FIG. 5 is a flow diagram illustrating an example method for limiting the data rate of an integrated circuit based on toggle rate, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, node circuitry (e.g., circuit nodes 110) communicates via a data bus according to a data rate.

At 520, in the illustrated embodiment, toggle detector circuitry (e.g., toggle detector 120) determines a toggle rate between consecutive clock cycles for data on the data bus.

In some embodiments, the toggle detector circuitry is configured to aggregate the toggle rate over multiple cycles. The toggle detector may aggregate over multiple rolling multi-cycle windows of different lengths. The length of the rolling multi-cycle window may be programmable. In some embodiments, the toggle detector circuitry may use exclusive-or (XOR) circuitry to compare data values at different circuit nodes in a given cycle. The toggle detector circuitry may quantize the determined toggle rate.

At 530, in the illustrated embodiment, the toggle detector circuitry (e.g., toggle detector 120) provides toggle information to data rate limiter circuitry (e.g., data rate limiter control 130) based on the determined toggle rate. In some embodiments, the toggle information directly encodes the toggle rate. In other embodiments, the toggle information includes an average of the toggle rate, a trigger based on the toggle rate, etc.

In some embodiments, the toggle information includes one or more of the following signals: a trigger signal for a data rate limit operation and a value that indicates a toggle amount. The toggle information may represent the toggle rate over a multi-cycle window.

At 540, in the illustrated embodiment, data rate limiter circuitry (e.g., data rate limiter control 130) limits the data rate based on one or more limit inputs and the provided toggle information.

In some embodiments, the data rate limiter circuitry is configured to limit the data rate in a first scenario where the one or more limit inputs have a first state and the toggle information corresponds to a threshold toggle scenario, and refrain from limiting the data rate in a second scenario where the one or more limit inputs have the same first state but the toggle information does not correspond to the threshold toggle scenario. The limit inputs may include supply-voltage information, electrical-current draw information, temperature information, and component activity information. The data rate limiter circuitry may insert delay cycles in the node circuitry to limit the data rate for the node circuitry. The data rate limiter circuitry may reduce a frequency of an input clock to the node circuitry to limit the data rate for the node circuitry.

In some embodiments, the computing device further comprises second toggle detector circuitry (e.g., toggle detector 120N) configured to determine another toggle rate for other data in a given clock cycle, and multi-detector trigger logic (e.g. multi-detector trigger logic 410) configured to receive the toggle information from both the first toggle detector circuitry and the second toggle detector circuitry, and determine whether to perform a toggle-based operation based on the toggle information from both the first toggle detector circuitry and the second toggle detector circuitry. The toggle-based operation could be asserting a trigger to a rate limiter, changing a rate limit (e.g., if the multi-detector trigger logic is included in a rate limiter circuit), etc. The multi-detector trigger logic may perform the toggle-based operation in response to detecting at least one scenario of the following scenarios: both of the first toggle detector circuitry and the second toggle detector circuitry indicating a first threshold toggle rate and at least one of the first toggle detector circuitry and the second toggle detector circuitry indicating a second, greater threshold toggle rate.

In some embodiments, the computing device estimates power consumption based on the toggle information.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

As used herein, the terms "clock" and "clock signal" refer to a periodic signal, e.g., as in a two-valued (binary) electrical signal. A clock periodically changes between "levels" of the clock such as voltage ranges of an electrical signal. For example, voltages greater than 0.7 volts may be used to represent one clock level and voltages lower than 0.3 volts may be used to represent another level in a binary configuration. As used herein, the term "clock edge" refers to a change in a clock signal from one level to another level. As used herein, the term "toggle" in the context of a clock signal refers to changing the value of the clock signal from one level to another level in a binary clock configuration. As used herein, the term clock "pulse" refers to an interval of a clock signal between consecutive edges of the clock signal (e.g., an interval between a rising edge and a falling edge or an interval between a falling edge and a rising edge). Note that sequential circuitry may perform operations on a rising edge of a clock signal, a falling edge of a clock signal, or both (which may be referred to as dual-edge triggered).

Example Device

Figure 6:
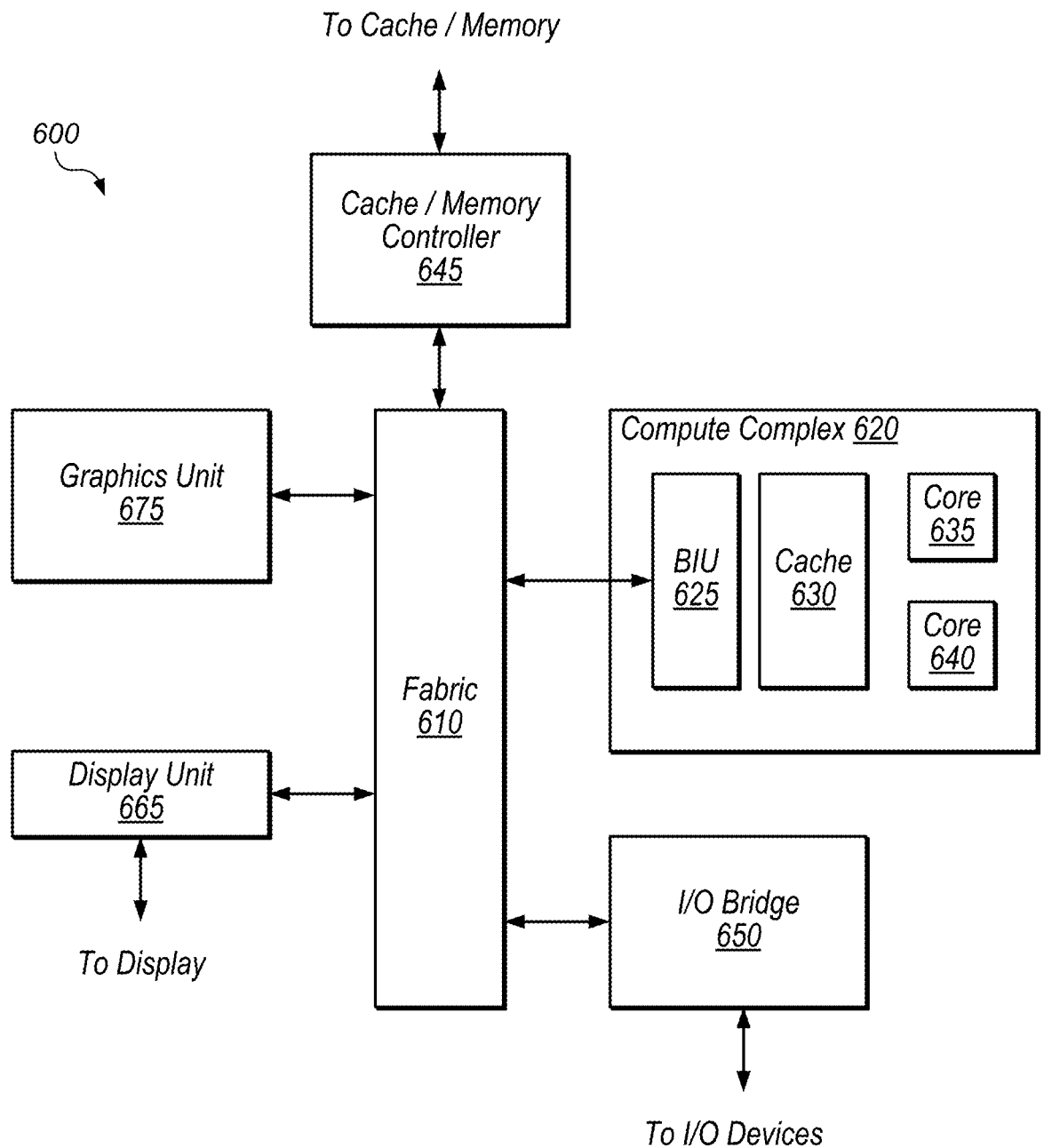
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

In some embodiments, disclosed toggle-based rate limiting may improve performance of compute complex 620 in certain power scenarios.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

In some embodiments, disclosed toggle-based rate limiting may improve performance of cache/memory controller 645 in certain power scenarios. For example, toggle detector circuitry that monitors connections to the cache/memory controller 645 may allow accurate profiling of dynamic power consumption relating to memory accesses.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed toggle-based rate limiting may improve performance of graphics unit 675 in certain power scenarios.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
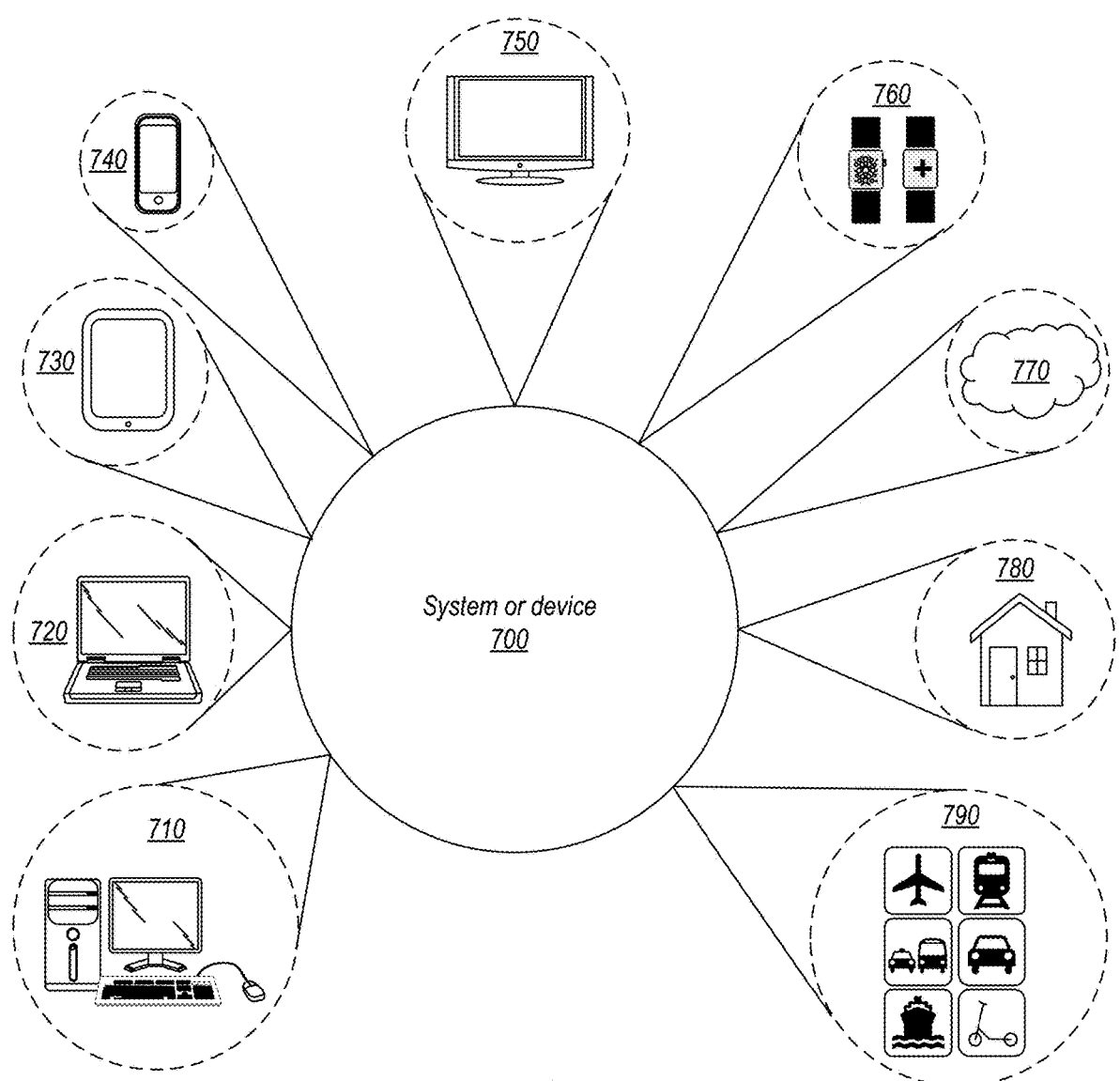
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
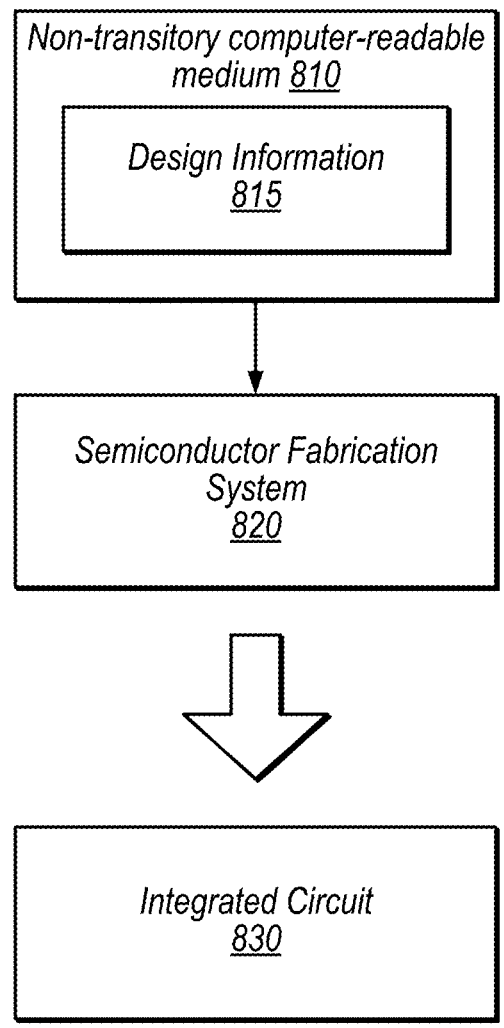
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-4, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured to" perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
   node circuitry configured to communicate via a data bus according to a data rate;
   data rate limiter circuitry configured to control the data rate; and
   first toggle detector circuitry configured to:
      determine a toggle rate between consecutive clock cycles for data on the data bus, wherein the toggle rate corresponds to a number of bits that changed on the data bus between consecutive clock cycles; and
      provide toggle information to the data rate limiter circuitry based on the determined toggle rate;
   wherein the data rate limiter circuitry is configured to limit the data rate for the node circuitry based on:
      one or more limit inputs; and
      the provided toggle information.

2. The apparatus of claim 1, wherein the one or more limit inputs include one or more of the following inputs:
   supply-voltage information;
   electrical current draw information;
   temperature information; and
   component activity information.

3. The apparatus of claim 1, wherein the data rate limiter circuitry is configured to:
   limit the data rate in a first scenario where the one or more limit inputs have a first state and the toggle information corresponds to a threshold toggle scenario; and
   refrain from limiting the data rate in a second scenario where the one or more limit inputs have the same first state but the toggle information does not correspond to the threshold toggle scenario.

4. The apparatus of claim 1, wherein:
   the first toggle detector circuitry is configured to aggregate the toggle rate over multiple cycles; and
   the provided toggle information represents the toggle rate over a rolling multi-cycle window.

5. The apparatus of claim 4, wherein the first toggle detector circuitry is configured to aggregate the toggle rate over multiple rolling multi-cycle windows of different lengths.

6. The apparatus of claim 4, wherein a length of the rolling multi-cycle window is programmable.

7. The apparatus of claim 1, further comprising:
second toggle detector circuitry configured to determine another toggle rate for other data in a given clock cycle; and
multi-detector trigger logic configured to:
receive toggle information from both the first toggle detector circuitry and the second toggle detector circuitry; and
determine whether to perform a toggle-based operation based on the toggle information from both the first toggle detector circuitry and the second toggle detector circuitry.

8. The apparatus of claim 7, wherein the multi-detector trigger logic is configured to perform the toggle-based operation in response to detecting at least one scenario of the following scenarios:
both of the first toggle detector circuitry and the second toggle detector circuitry indicating a first threshold toggle rate; and
at least one of the first toggle detector circuitry and the second toggle detector circuitry indicating a second, greater threshold toggle rate.

9. The apparatus of claim 1, wherein the toggle information includes one or more signals of the following signals:
a trigger signal for a data rate limit operation; and
a value that indicates a toggle amount.

10. The apparatus of claim 1, wherein, to determine the toggle rate between consecutive clock cycles for data on the data bus, the first toggle detector circuitry is configured to use exclusive-or (XOR) circuitry to compare data values at different circuit nodes in a given cycle.

11. The apparatus of claim 1, wherein, to limit the data rate for the node circuitry, the data rate limiter circuitry is configured to insert delay cycles in the node circuitry.

12. The apparatus of claim 1, wherein, to limit the data rate for the node circuitry, the data rate limiter circuitry is configured to reduce a frequency of an input clock to the node circuitry.

13. The apparatus of claim 1, further comprising:
power estimation circuitry configured to estimate power consumption by the apparatus based on the toggle information.

14. The apparatus of claim 1, wherein the first toggle detector circuitry is configured to quantize the determined toggle rate.

15. The apparatus of claim 1, wherein the apparatus is a computing device that further includes:
a central processing unit;
a display; and
network interface circuitry.

16. A method, comprising:
communicating, by a computing device, via a data bus according to a data rate;
determining, by the computing device, a toggle rate between consecutive clock cycles for data on the data bus, wherein the toggle rate corresponds to a number of bits that changed on the data bus between consecutive clock cycles; and
limiting, by the computing device, the data rate of the data bus based on:
one or more limit inputs; and
the determined toggle rate.

17. The method of claim 16, further comprising aggregating the toggle rate over a rolling multi-cycle window.

18. The method of claim 17, further comprising:
limiting the data rate in a first scenario where the one or more limit inputs have a first state and the toggle rate corresponds to a threshold toggle scenario; and
refraining from limiting the data rate in a second scenario where the one or more limit inputs have the same first state but the toggle rate does not correspond to the threshold toggle scenario.

19. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
node circuitry configured to communicate via a data bus according to a data rate;
data rate limiter circuitry configured to control the data rate; and
first toggle detector circuitry configured to:
determine a toggle rate between consecutive clock cycles for data on the data bus, wherein the toggle rate corresponds to a number of bits that changed on the data bus between consecutive clock cycles; and
provide toggle information to the data rate limiter circuitry based on the determined toggle rate;
wherein the data rate limiter circuitry is configured to limit the data rate for the node circuitry based on:
one or more limit inputs; and
the provided toggle information.

20. The non-transitory computer readable storage medium of claim 19, wherein the design information further specifies that the circuit includes:
second toggle detector circuitry configured to determine another toggle rate for other data in a given clock cycle; and
multi-detector trigger logic configured to:
receive toggle information from both the first toggle detector circuitry and the second toggle detector circuitry; and
determine whether to perform a toggle-based operation based on the toggle information from both the first toggle detector circuitry and the second toggle detector circuitry.

* * * * *